(12) United States Patent
Lewis et al.

(10) Patent No.: US 7,900,960 B2
(45) Date of Patent: Mar. 8, 2011

(54) SYSTEM FOR TUNING INITIAL ONSET

(75) Inventors: Robert E. Lewis, West Haven, UT (US);
Gregory J. Lang, South Ogden, UT (US); Brian A. Laubacher, Pleasant View, UT (US)

(73) Assignee: Autoliv ASP, Inc., Ogden, UT (US)

(*) Notice: Subject to any disclaimer, the term of this patent is extended or adjusted under 35 U.S.C. 154(b) by 157 days.

(21) Appl. No.: 12/152,180

(22) Filed: May 13, 2008

(65) Prior Publication Data

US 2009/0283996 A1 Nov. 19, 2009

(51) Int. Cl.
*B60R 21/26* (2006.01)
*B60R 21/268* (2006.01)

(52) U.S. Cl. .......................... 280/737; 280/742
(58) Field of Classification Search .......... 280/736, 280/737, 741, 742
See application file for complete search history.

(56) References Cited

U.S. PATENT DOCUMENTS

| | | | |
|---|---|---|---|
| 3,721,102 A | 3/1973 | Green | |
| 4,590,041 A | 5/1986 | Hill | |
| 5,482,075 A | 1/1996 | Farwell et al. | |
| 5,531,473 A * | 7/1996 | Rink et al. | 280/737 |
| 5,630,619 A * | 5/1997 | Buchanan et al. | 280/741 |
| 5,794,973 A * | 8/1998 | O'Loughlin et al. | 280/737 |
| 5,813,695 A | 9/1998 | O'Driscoll et al. | |
| 5,907,120 A | 5/1999 | Mooney et al. | |
| 6,086,094 A * | 7/2000 | Stevens et al. | 280/741 |
| 6,189,926 B1 | 2/2001 | Smith | |
| 6,485,053 B2 | 11/2002 | Fujimoto et al. | |
| 6,572,141 B2 * | 6/2003 | Nanbu | 280/736 |
| 6,655,712 B1 | 12/2003 | Larsen et al. | |
| 6,851,705 B2 | 2/2005 | Young et al. | |
| 7,004,500 B2 * | 2/2006 | Dinsdale et al. | 280/737 |
| 7,052,040 B2 | 5/2006 | Matsuda et al. | |
| 7,114,746 B2 | 10/2006 | Miyaji et al. | |
| 7,290,797 B2 | 11/2007 | Lang et al. | |
| 7,367,584 B2 | 5/2008 | Blackburn | |
| 2002/0036399 A1 * | 3/2002 | Nanbu | 280/741 |
| 2004/0046373 A1 | 3/2004 | Wang et al. | |
| 2006/0001247 A1 * | 1/2006 | Young et al. | 280/741 |
| 2006/0091660 A1 * | 5/2006 | Lang et al. | 280/737 |
| 2009/0283996 A1 | 11/2009 | Lewis et al. | |

* cited by examiner

*Primary Examiner* — Paul N Dickson
*Assistant Examiner* — Joseph Rocca
(74) *Attorney, Agent, or Firm* — Sally J Brown; Madson IP, P.C.

(57) ABSTRACT

A deployable inflator that includes a quantity of gas generant. The generant is designed to produce a supply of inflation gas during deployment of the inflator. The inflator includes a first burst disk and a second burst disk. The first and second burst disks are separated by a cavity. The inflator also includes an opening (or multiple openings). During deployment, the inflation gas flows into the cavity via the opening(s) and ruptures the first burst disk to allow inflation gas to escape the inflator. The second burst disk ruptures after the pressure in the cavity drops sufficiently below the pressure on the other side of the second burst disk. This inflator reduces the initial onset rate of deployment.

15 Claims, 4 Drawing Sheets

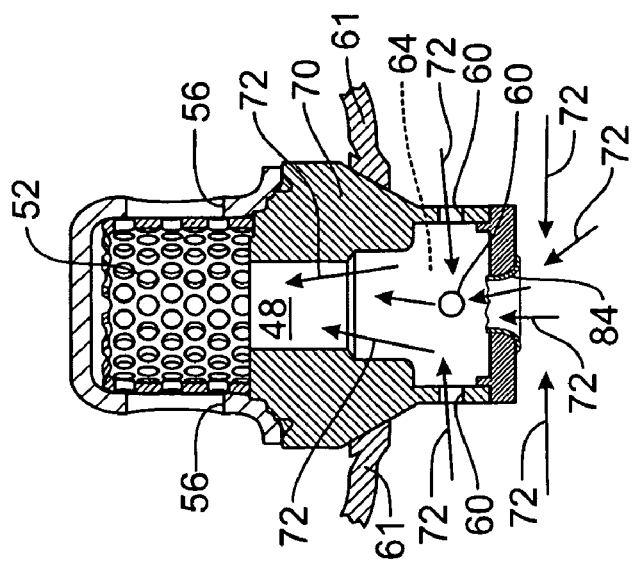
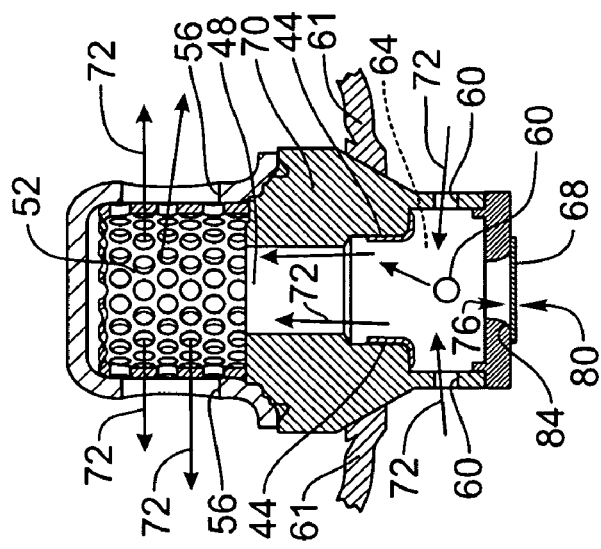
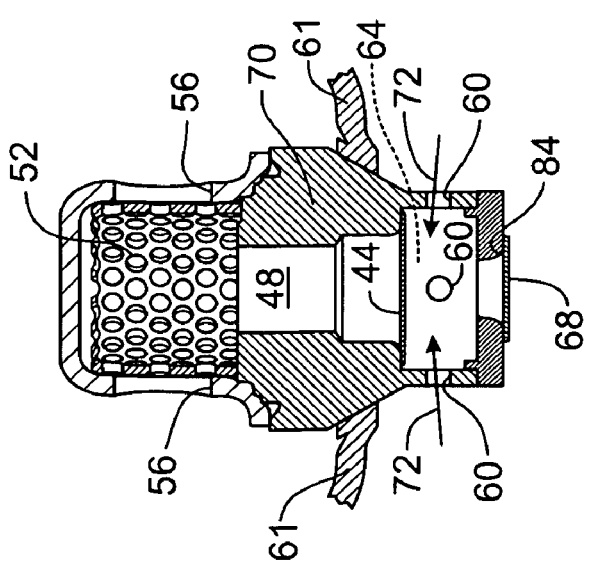

SYSTEM FOR TUNING INITIAL ONSET

BACKGROUND OF THE INVENTION

Airbags and airbag systems have been known and used for decades and have been credited with saving many lives and preventing many injuries. Airbag systems are used to deploy an airbag during a crash into a vehicle interior so that the vehicle occupant will impact the deployed airbag rather than the harder surface(s) of the vehicle interior.

Airbag systems generally include an inflator. An inflator is a device that is designed to produce and/or channel a quantity of inflation gas into the airbag during the deployment process. This influx of gas into the airbag inflates and deploys the airbag into the proper position. A variety of different inflators are known in the industry.

One type of known inflator is the so-called "hybrid" inflator. Hybrid inflators include a quantity of stored gas along with a pyrotechnic gas generant that is combusted to produce additional inflation gas necessary to deploy the airbag. Accordingly, hybrid inflators generally include the quantity of gas generant housed within a housing that is contained in a pressure vessel.

Hybrid inflators deliver large quantities of inflation gas very quickly—i.e., within a few milliseconds. The pressure within a hybrid inflator may increase very rapidly due to the combustion of the gas generant. This increase in the pressure of the inflator corresponds with a certain initial rate of gas delivery to the airbag. This is referred to as the "onset" rate. In some situations, it may be desirable to lower the onset rate of the airbag used with a hybrid inflator. Such lowering of the onset rate will deploy the airbag at a slower velocity and may be beneficial if, for example, the occupant is "out-of-position." Further, if the onset is decreased, the load acting on the airbag module would also decrease, thereby reducing the necessity and cost of using materials that can withstand extreme pressures.

Accordingly, the present embodiments relate to a new type of inflator that reduces the onset rate of a hybrid inflator.

BRIEF SUMMARY OF THE INVENTION

An inflator comprises a quantity of stored gas and a gas generant that produces a supply of inflation gas during deployment. The inflator also comprises a gas bottle having a first burst disk and a second burst disk, the first and second burst disk being separated by a cavity within the gas bottle. An opening is also added in the cavity. During deployment, the stored gas and inflation gas flows through the opening into the cavity and ruptures the first burst disk allowing gas to exit the inflator. The second burst disk ruptures after the pressure in the cavity drops sufficiently below the pressure on the generant-side of the second burst disk. The first burst disk may be downstream of the second burst disk.

In some embodiments, it is possible to locate the opening on the second burst disk. In other embodiments, the gas bottle further comprises a nozzle skirt, the opening can be positioned on the nozzle skirt. In other embodiments, a plurality of openings may be on the nozzle skirt. The opening may be positioned between the first and second burst disks. The gas passing through the opening reduces the initial pressure of the gas within the inflator. In other embodiments, the gas may pass through a diffuser positioned exterior of the first burst disk prior to exiting the inflator.

The second burst disk may rupture at a selected burst pressure. In some embodiments, the second burst disk ruptures at a selected burst pressure, wherein this pressure is achieved within about 10 milliseconds after the first burst disk is ruptured. In other embodiments, predetermining the burst pressure for the second burst disk tailors the rupturing of the second burst disk to occur at a desired pressure in the cavity and/or a desired time after deployment.

In some embodiments, the inflator further comprises a second quantity of gas generant that produces a supply of inflation gas during deployment. The first and second quantities of gas generant may produce the supply of inflation gas at the same time. The gas may exit the inflator between the first and second quantities of gas generant. The stored gas may be continuously exiting the inflator from the time the first burst disk ruptures.

The present embodiments relate to an inflator that is designed to reduce the initial onset rate associated with deployment. The inflator includes a quantity of gas generant that will be converted into a supply of inflation gas during deployment. The inflator includes a first burst disk and a second burst disk. The first and second burst disks are separated by a cavity. The inflator also includes an opening (or multiple openings).

The stored gas and the supply of inflation gas flows through the openings and enters the cavity after the first burst disk ruptures. The pressure of deployment causes the first burst disk to rupture, thereby allowing the inflation gas to exit the inflator. The second burst disk is not ruptured when the first burst disk is ruptured. Rather, the second burst disk remains intact until a sufficient pressure differential exists across the disk.

As the gas begins to exit out of the cavity (as a result of the first burst disk being ruptured), the pressure on the downstream side of the second burst disk becomes less than the pressure on the upstream side of the second burst disk. Further, as the gas generant combusts, the pressure upstream of the second burst disk may increase. When the pressure on the upstream side of the second burst disk rises sufficiently above the pressure on the downstream side, the second burst disk likewise ruptures, thereby allowing gas to enter the cavity from the chamber through the orifice that had been previously sealed by the second burst disk. In many embodiments, the second burst disk is selected to rupture within 5 to 10 milliseconds after the first burst disk is ruptured.

This deployment procedure provides advantages. Prior to the rupturing of the second burst disk, the gas is forced to flow through the openings before it can exit the inflator. Such a restriction on the flow of gas reduces the gas that can initially escape the inflator, and thus, the initial onset rate of the inflator is significantly reduced. However, as the pressure of the cavity is reduced (based upon the flow of the gas out of the cavity through the ruptured first burst disk), the second burst disk is ruptured to allow more gas to exit. This exiting of the gas allows the gas to rapidly inflate the airbag. Thus, the inflator has a low onset rate, but can still adequately and appropriately fill the airbag.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A is an enlarged sectional view of a portion of FIG. 1;

FIG. 2B is a view similar to FIG. 2A, which shows the inflator after the first burst disk has been ruptured;

FIG. 2C is a view similar to FIG. 2B, which shows the inflator after the second burst disk has been ruptured.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
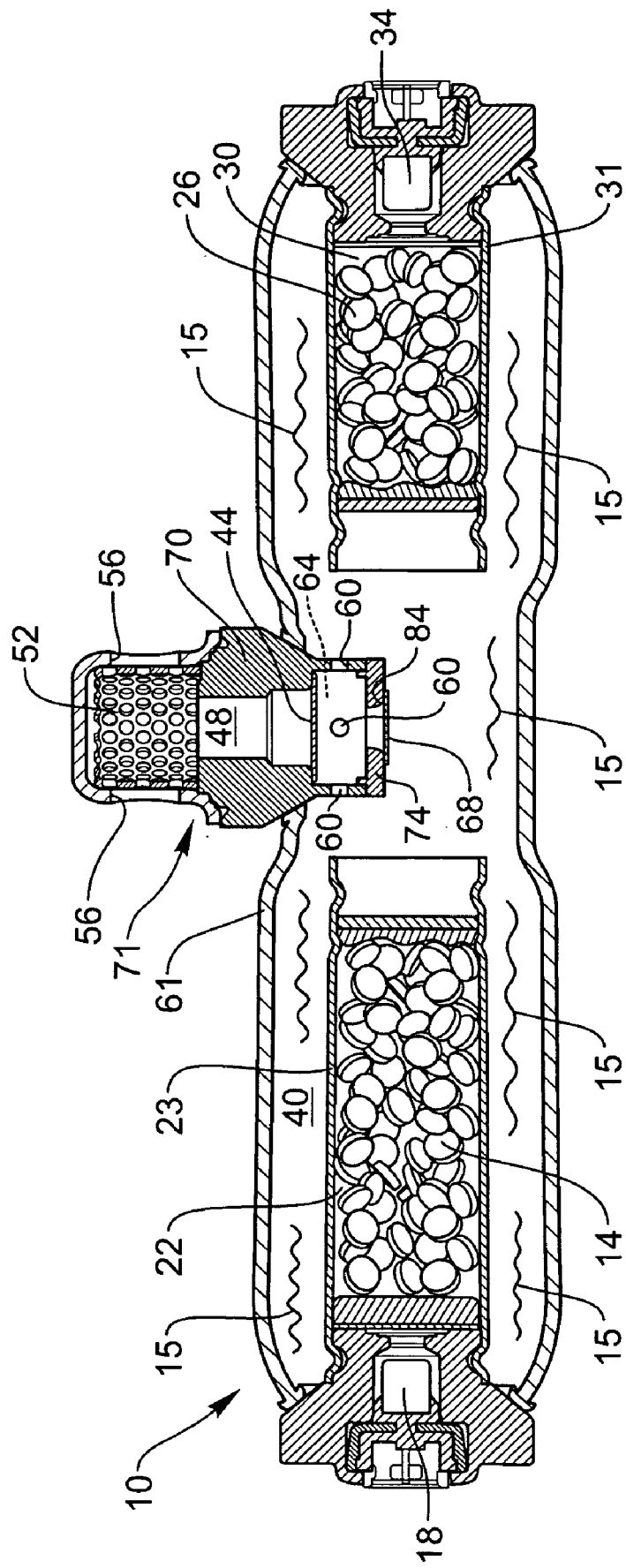
FIG. 1 is a longitudinal sectional view of an inflator according to the present embodiments.

FIG. 1 is a longitudinal sectional view that illustrates an inflator 10 according to the present embodiments that may be used in conjunction with an airbag module (not shown). Those skilled in the art will appreciate how to use the inflator 10 with an airbag module. As described herein, the inflator 10 is designed to control and reduce the initial onset rate (i.e., the initial pressure) within the inflator 10. Such a reduction of the onset rate may be used to deploy the airbag at a slower velocity and may be beneficial if, for example, the occupant is "out-of-position." Further, if the initial pressure of the inflator 10 is decreased, the load acting on the airbag module (not shown) would also decrease, thereby reducing the necessity and cost of using materials that can withstand extreme pressures.

The inflator 10 includes a quantity of gas generant 14. This quantity of gas generant 14 will be converted into a supply of inflation gas during deployment. Once this inflation gas is formed, this gas may be used to inflate an airbag (not shown). In order to inflate the gas generant 14, an initiator 18 may be used. The inflator 10 may also include a quantity of stored gas 15, thereby making the inflator 10 a "hybrid" inflator.

The gas generant 14 may be housed within a chamber 22. The chamber 22 may be defined by generant housing 23. However, those skilled in the art will appreciate that, when the gas generant 14 is ignited, the formed gas will exit the chamber 22 so that it may be channeled into the airbag. It should be noted that the use of gas generant 14 and an initiator 18 is conventional in this field. Those skilled in the art would appreciate that any type of gas generant or initiator and/or any configuration/shape of such components may be used herein.

The inflator 10 may further comprise a second quantity of gas generant 26 that is housed within a chamber 30. The chamber 22 may be defined by generant housing 31. This gas generant 26 may be ignited/combusted by an initiator 34. The second quantity of gas generant 26 may be ignited before, simultaneously with, or after the ignition of the gas generant 14, as desired. Again those skilled in the art will appreciate that if the gas generant 26 is ignited, a gas will be formed that will exit the chamber 30 (in a manner known in the art) and may be used to inflate an airbag.

Although the embodiment of FIG. 1 includes both a first and second gas generant 14, 26, those skilled in the art will appreciate that only one supply of gas generant and/or one initiator may be used. Other embodiments may be designed in which more than two quantities of gas generant are used.

The inflator 10 includes a gas bottle 61 that defines a pressure chamber 40. The pressure chamber 40 is sealed by a first burst disk 44. When the inflator 10 is actuated, the supply of inflation gas will be created and the pressure will build within the inflator 10 sufficient to rupture the first burst disk 44. In other words, the gas will exit the chambers 22, 30 and will enter the chamber 40. Further embodiments may be designed in which the first and second quantities of generant 14, 26 are not housed within separate chambers, but are simply in the same, larger chamber (such as the chamber 40).

Once ruptured, the gas may flow through the gas flow path 48, through a diffuser 52 and exit the inflator 10 via openings 56. (In some embodiments, a filter may be used in lieu of or in conjunction with the diffuser 52). As shown in FIG. 1, the diffuser 52, the gas flow path 48, and the openings 56 are all positioned exterior of the first burst disk 44. The gas will exit the inflator 10 between (intermediate) of the first and second quantities of gas generant 14, 26.

In order to access the first burst disk 44, the gas must travel through one or more openings 60. In the embodiment shown in FIG. 1, four (4) openings are used. More or less than four openings 60 are clearly possible. When the gas flows through the openings 60, it will enter a cavity 64. The first burst disk 44 seals the cavity 64 from the gas flow path 48. (When the cavity 64 is sealed, the entire pressure chamber 40 is sealed). During deployment, the gas will pressurize the cavity 64 and cause the first burst disk 44 to rupture during deployment. As will be explained in greater detail below, the inflator 10 has a second burst disk 68.

As shown in FIG. 1, the first and second burst disks 44, 68 are spaced from each other and separated by the cavity 64. In other words, on one side of the second burst disk 68 is the cavity 64 (the "cavity-side") and on the other side is the pressure chamber 40 (which may be referred to as the "generant-side"). (The cavity-side and generant-side are shown in FIG. 2B). The first burst disk 44 may be positioned on the cavity-side of the second burst disk 68. This means that the first burst disk 44 is positioned closer to the openings 56 than is the second burst disk 68. In the embodiment of FIG. 1, the opening(s) 60 may be positioned between the first and second burst disks 44, 68. This means that the opening(s) 60 is positioned closer to the openings 56 than is the second burst disk 68, but that the first burst disk 44 is positioned closer to the openings 56 than is the opening 60.

The gas bottle 61 comprises a nozzle portal 71 and a nozzle skirt 70. The skirt 70 that extends downward into the chamber 40. The cavity 64 and the gas flow path 48 are positioned within the nozzle skirt 70. The openings 60 are disposed in the nozzle skirt 70 to allow access into the cavity 64. A secondary plate 74 may be positioned on the nozzle skirt 70. The secondary plate 74 includes an orifice 84 that is sealed by the second burst disk 68.

FIGS. 2A through 2C shows the stages of deployment of the inflator 10 (shown in FIG. 1) in greater detail. FIG. 2A shows the inflator 10 as it is being deployed. The supply of inflation gas 72 (represented by arrows) flows through the openings 60 and enters the cavity 64. This inflation gas 72 contacts the first burst disk 44. The supply of inflation gas 72 is produced by the ignition of the gas generant 14 and/or the gas generant 26. (If both of these generant supplies are used, the gas formed by each supply will mix together). The inflation gas 72 may also be formed, in part, by the stored gas 15. (In other words, the stored gas 15 mixes with the supply of gas produced by the generant supplies). However, by having the gas 72 flow into the cavity, the gas 72 becomes positioned between the first and second burst disks 44, 68.

FIG. 2B shows the stage of deployment of the inflator 10 (shown in FIG. 1) after the first burst disk 44 has been ruptured. Specifically, the inflation gas 72 and/or the pressure of deployment causes the first burst disk 44 to rupture, thereby allowing the inflation gas 72 to enter the gas flow path 48 and ultimately exit the inflator 10 via the openings 56 (as shown graphically in FIG. 2B). In some embodiments, the gas 72 enters the cavity 64 after the first burst disk 44 has been ruptured. Specifically, the stored gas may be continuously exiting the inflator from the time the first burst disk ruptures.

As shown in FIG. 2B, the second burst disk 68 is not ruptured when the first burst disk 44 is ruptured. Rather, the second burst disk 68 remains in tact. However, as shown in FIG. 2C, as the gas exits out of the cavity 64 (as a result of the first burst disk 44 being ruptured), the pressure on the cavity-side 76 (which may be the exterior side) of the second burst disk 68 becomes much less than the pressure on the generant-side 80 (which may be the interior side) of the second burst disk 68. (The cavity-side 76 and generant-side 80 are shown in FIG. 2B). When the pressure on the cavity-side 76 (exterior or downstream side) of the second burst disk 68 drops sufficiently below the pressure on the generant side 80 (interior, downstream side), the second burst disk 68 likewise ruptures, thereby allowing gas 72 to enter the cavity 64 from the chamber 40 (shown in FIG. 1) through the orifice 84 that had been previously sealed by the second burst disk 68. Such rupturing of the second burst disk 68 causes a drop in the pressure in the chamber 40. In many embodiments, the second burst disk 68 will rupture within 5 to 10 milliseconds after the first burst disk 44 is ruptured.

Referring now to FIGS. 1 and 2A-2C collectively, it will be readily apparent that the inflator 10 may provide significant advantages. For example, prior to the rupturing of the second burst disk 68, the gas 72 is forced to flow through the openings 60 before it can exit the inflator 10. Such a restriction on the flow of gas reduces the gas that can initially escape the inflator 10, and thus, the initial onset rate of the inflator 10 (or corresponding airbag) is significantly reduced. However, as the pressure of the cavity 64 is reduced (based upon the flow of the gas out of the cavity 64 through the ruptured burst disk 44), the second burst disk 68 is ruptured to allow more gas 72 to exit the chamber 40. This exiting of the gas 72 through the orifice 84 allows the gas 72 to rapidly inflate the airbag (not shown). Thus, the inflator 10 has a low onset rate, but can still adequately and appropriately fill the airbag.

It should also be noted that the rupturing of the second burst disk 68 may be tailored as desired. For example, the second burst disk 68 may be constructed such that it will rupture at a specified burst pressure. (As noted above, in some embodiments, this burst pressure may be achieved within about 10 milliseconds after the first burst disk 44 ruptures). In other embodiments, the second disk 68 will not rupture until the pressure differential between the cavity side 76 and the generant side 80 exceeds a desired, threshold level. In other embodiments, the burst pressure for the second burst disk 68 is selected such that the disk 68 will rupture when a predetermined pressure in the cavity 64 is achieved. Such tailoring of the second burst disk 68 can be determined easily by those skilled in the art. Also, such tailoring may be useful to increase and/or decrease the way in which the airbag is inflated.

Figure 3:
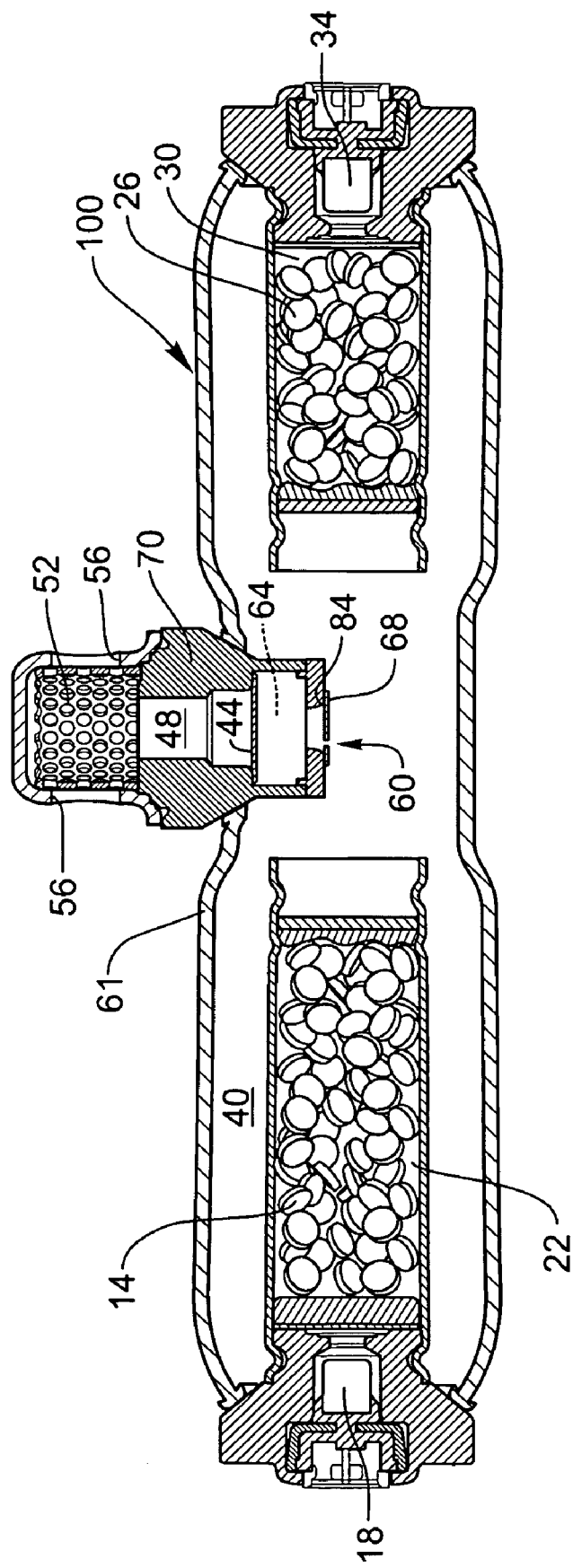
FIG. 3 is a longitudinal sectional view of another embodiment.

Referring now to FIG. 3, a second embodiment of an inflator 100 according to the present embodiments is illustrated. The inflator 100 is similar in structure to the inflator 10 (shown in FIG. 1). Accordingly, for purposes of brevity, much of the above-recited discussion will not be repeated. Rather, the main difference between the inflator 100 and the inflator 10 is that, in the inflator 100, the opening 60 (or openings 60, as desired) leading to the cavity 64 are positioned on the second burst disk 68. As with the previous embodiments, such opening(s) 60 release a small amount of gas to reduce the initial onset rate, and when the second burst disk 68 is ruptured, the remainder of the gas is released. Those skilled in the art would appreciate other configurations and/or shapes that this embodiment may be constructed.

Figure 4:
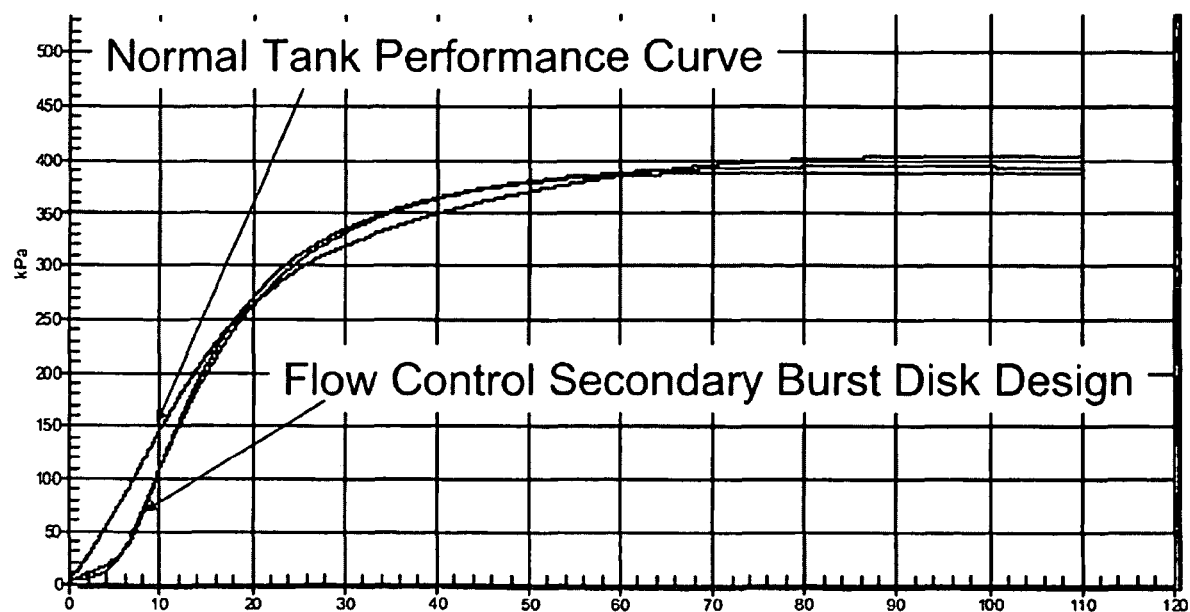
FIG. 4 is a graph of a test of an inflator that has the reduced onset according to the present embodiments.

FIG. 4 is a graph of a test of an inflator that has the reduced onset according to the present embodiments (which is designated as the "Flow Control Secondary Burst Disk Design" versus an inflator that does not include such features. The vertical axis of this graph is pressure in a tank downstream of the inflator whereas the horizontal axis is time in milliseconds. As can be seen in this graph, the pressure of the "Flow Control Secondary Burst Disk Design" has a pressure less than the other inflator for times under about 18 milliseconds.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator comprising:
   a quantity of gas generant that produces a supply of inflation gas during deployment;
   a gas bottle having a first burst disk and a second burst disk, the first and second burst disk being separated by a cavity within the gas bottle; and
   at least one opening, wherein during deployment, the inflation gas flows through the opening into the cavity and ruptures the first burst disk allowing the inflation gas to exit the inflator,
   wherein, the second burst disk has a cavity-side and a generant-side and the second burst disk ruptures after the pressure on the cavity-side drops sufficiently below the pressure on a generant-side of the second burst disk.

2. An inflator as in claim 1 wherein the opening is located on the second burst disk.

3. An inflator as in claim 1 further comprising a nozzle portal and a nozzle skirt, the opening being positioned on the nozzle skirt.

4. An inflator as in claim 3 wherein the at least one opening comprises a plurality of openings positioned on the nozzle skirt.

5. An inflator as in claim 1 wherein the at least one opening is positioned between the first and second burst disks.

6. An inflator as in claim 1 wherein the second burst disk ruptures at a selected burst pressure, wherein this pressure is achieved within about 10 milliseconds after the first burst disk is ruptured.

7. An inflator as in claim 1 wherein the inflation gas passing through the opening reduces the initial pressure of the inflation gas within the bottle.

8. An inflator as in claim 1 wherein the burst pressure for the second burst disk is selected to tailor the rupturing of the second burst disk to occur at predetermined pressure in the cavity.

9. An inflator as in claim 1 wherein the gas passes through a diffuser positioned downstream of the first burst disk prior to exiting the inflator.

10. An inflator as in claim 1 further comprising a second quantity of gas generant that produces a supply of inflation gas during deployment.

11. An inflator as in claim 10 wherein the first and second quantities of gas generant produce the supply of inflation gas at the same time.

12. An inflator as in claim 10 wherein the inflation gas exits the inflator between the first and second quantities of gas generant.

13. An inflator as in claim 1 wherein the first burst disk is downstream of the second burst disk.

14. An inflator as in claim 1 further comprising a quantity of stored gas.

15. An inflator as in claim 1 wherein the opening is added to the cavity.

* * * * *